United States Patent [19]
Inoue

[11] Patent Number: 6,011,103
[45] Date of Patent: Jan. 4, 2000

[54] AQUEOUS DISPERSION OF CATIONIC FINE GRAIN GEL AND PROCESS FOR PREPARING THE SAME

[75] Inventor: Tetsuya Inoue, Osaka, Japan

[73] Assignee: Arakawa Kagaku Kogyo Kabushiki Kaisha, Osaka, Japan

[21] Appl. No.: 08/945,030

[22] PCT Filed: Feb. 19, 1997

[86] PCT No.: PCT/JP97/00458

§ 371 Date: Oct. 21, 1997

§ 102(e) Date: Oct. 21, 1997

[87] PCT Pub. No.: WO97/31045

PCT Pub. Date: Aug. 28, 1997

[30] Foreign Application Priority Data

Feb. 23, 1996 [JP] Japan .................................... 8-61907

[51] Int. Cl.[7] ................................................ C08F 2/16
[52] U.S. Cl. ........................................................... 524/458
[58] Field of Search ............................................... 524/458

[56] References Cited

U.S. PATENT DOCUMENTS

| | | | |
|---|---|---|---|
| 3,976,824 | 8/1976 | Ariyoshi et al. | 526/23 |
| 4,021,484 | 5/1977 | Toda et al. | 260/567.6 P |
| 4,058,491 | 11/1977 | Steckler | 260/2.2 R |
| 5,288,782 | 2/1994 | Nakajima et al. | 524/272 |

FOREIGN PATENT DOCUMENTS

| | | |
|---|---|---|
| 61-159412 | 7/1986 | Japan . |
| 2-263805 | 10/1990 | Japan . |

*Primary Examiner*—Bernard Lipman
*Assistant Examiner*—Wu C. Cheng
*Attorney, Agent, or Firm*—Kubovcik & Kubovcik

[57] ABSTRACT

A process for preparing an aqueous dispersion of a cationic fine grain gel, comprising microemulsion polymerizing (polymerizing in microemulsions) an unsaturated monomer M under the presence of a polymer P which contains 30 to 92.5% by mole of a nonionic structure unit (a) and 70 to 7.5% by mole of a quaternary ammonium group-containing structure unit (b), and which contains the specific amount of a specific structure unit $(b_1)$ having a quaternary ammonium group and a polymerizable double bond, and an aqueous dispersion of a cationic fine grain gel obtainable by the process.

11 Claims, No Drawings

AQUEOUS DISPERSION OF CATIONIC FINE GRAIN GEL AND PROCESS FOR PREPARING THE SAME

TECHNICAL FIELD

The present invention relates to an aqueous dispersion of a cationic fine grain gel and a process for preparing the same.

BACKGROUND ART

Conventionally, as a typical synthetic method of a fine grain of polymer, a microemulsion polymerization (polymerization in microemulsions) method has been known. One example of the polymerization method is a synthetic method of a fine grain of polymer having a particle diameter of 10 to 100 nm or so, comprising solubilizing an unsaturated monomer (oil phase) in water phase under the presence of the large amount of an emulsifier and then, polymerizing the unsaturated monomer (cf. Macromol. Chem. Phy., 196, p.441–466 (1995)). Because various functions can be imparted to a fine grain of polymer obtained by the polymerization method by introducing functional groups into the surface of the fine grain, there are expectations of practical use of the fine grain in various uses.

When an aqueous dispersion of the fine grain of polymer having a particle diameter of at most 100 nm is prepared by the microemulsion polymerization method, as mentioned above, the large amount of the emulsifier is required. Accordingly, the obtained aqueous dispersion of the fine grain of polymer cannot always satisfactorily show needed properties because the aqueous dispersion strongly foams during using and water resistance of a film obtained from the fine grain of polymer is lowered, owing to the large amount of the emulsifier. Now, in order to overcome these defects, it is examined to use a high molecular emulsifier. However, because emulsifying force of the high molecular emulsifier is smaller than that of a low molecular emulsifier, there are generated other defects such that an emulsion is broken during polymerization, aggregates are generated, particle diameter of the resulting fine grain of polymer becomes larger with the passage of time and storage stability is lowered.

The present invention has been accomplished in consideration of the above prior art, and aims at providing an aqueous dispersion of a fine grain gel of polymer showing excellent polymerization stability, storage stability and water resistance and less susceptibility to bubbling, and a process for preparing the same.

In order to solve the problems in the above prior art, the inventor of the present invention has earnestly studied. As a result, the inventor has found that a specific cationic polymer containing a quaternary ammonium group shows great effect for solubilizing unsaturated monomers such as styrene and acrylic acid ester, and has excellent stability during microemulsion polymerization (polymerization in microemulsions). Also, the inventor has found that by introducing a polymerizable double bond into the side chain of the above cationic polymer, the cationic polymer is polymerized with the unsaturated monomer and a crosslinked structure can be imparted to the resulting fine grain. The present invention has been accomplished based on this knowledge.

DISCLOSURE OF THE INVENTION

The present invention relates to a process for preparing an aqueous dispersion of a cationic fine grain gel, characterized by microemulsion polymerizing (polymerizing in microemulsions) an unsaturated monomer M under the presence of a polymer P which is a polymer containing 30 to 92.5% by mole of a nonionic structure unit (a) and 70 to 7.5% by mole of a quaternary ammonium group-containing structure unit (b), and in which the content of a structure unit ($b_1$) having a quaternary ammonium group and a polymerizable double bond, represented by the formula (I):

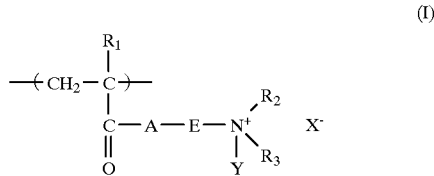

wherein $R_1$ is hydrogen atom or methyl group, each of $R_2$ and $R_3$ is independently an alkyl group having 1 to 4 carbon atoms, A is —O— or —NH—, E is an alkylene group having 2 to 4 carbon atoms or a hydroxy-substituted alkylene group, Y is a hydroxy-substituted aliphatic hydrocarbon residual group having one allyloxy group or one (meth)acryloyl group, or a vinyl aromatic hydrocarbon residual group, and $X^-$ is a halogen anion, a sulfate anion, an alkylsulfate anion, an acetate anion, (meth)acrylic acid anion or $OH^-$, is 1 to 100% by mole based on 100% by mole of the structure unit (b), and the content is at least 1% by mole based on 100% by mole of the total amount of the structure unit (a) and the structure unit (b).

Also, the present invention relates to an aqueous dispersion of a cationic fine grain gel obtainable by the above process.

BEST MODE FOR CARRYING OUT THE INVENTION

Hereinafter, the aqueous dispersion of a cationic fine grain gel and the process for preparing the same of the present invention are explained in detail.

In the present invention, in order to obtain the aimed aqueous dispersion of a cationic fine grain gel, it is necessary to use the polymer P (hereinafter referred to as "cationic polymer P") containing the specific amount of the nonionic structure unit (a) and the specific amount of the quaternary ammonium group-containing structure unit (b) which contains the structure unit ($b_1$), as an essential component, having the quaternary ammonium group and the polymerizable double bond, represented by the above formula (I). The total amount of the above structure unit (b) may consist of the structure unit ($b_1$). The above cationic polymer P functions not only as an emulsifier for polymerization against the unsaturated monomer M but also as a crosslinking agent during microemulsion polymerization of the unsaturated monomer M.

The components for preparing the above cationic polymer P are a cationic unsaturated monomer which is required for introducing the quaternary ammonium group into the molecule of the cationic polymer P, a quaternizing agent having a polymerizable double bond (hereinafter referred to as "quaternizing agent (I)"), which is required for introducing the quaternary ammonium group and the polymerizable double bond into the molecule of the cationic polymer P, and a nonionic unsaturated monomer which is required for adjusting emulsifying property of the cationic polymer P. In the present invention, a quaternizing agent not having a polymerizable double bond (hereinafter referred to as "quaternizing agent (II)") can also be used for quaternizing the above cationic unsaturated monomer. The quaternizing agent (II) does not introduce the polymerizable double bond into the molecule of the cationic polymer P but can introduce the quaternary ammonium group into the molecule.

Examples of the above cationic unsaturated monomer are, for instance, a tertiary amino group-containing unsaturated monomer, a neutralized salt of the monomer with an inorganic acid or an organic acid, and the like.

Examples of the above tertiary amino group-containing unsaturated monomer are, for instance, N,N-dimethylaminoethyl(meth)acrylate, N,N-diethylaminoethyl (meth)acrylate, N,N-dimethylaminopropyl(meth) acrylamide, N,N-diethylaminopropyl(meth)acrylamide, allylamine, diallylamine, triallylamine and the like. These can be used alone or in an admixture thereof. In the present description and claims, the terminology "(meth)acryl" means "acryl" or "methacryl".

Examples of the above neutralized salt of the tertiary amino group-containing unsaturated monomer with the inorganic acid or the organic acid are, for instance, a salt of the monomer with an inorganic acid such as hydrochloric acid, sulfuric acid or acetic acid; a salt of the monomer with an organic acid such as (meth)acrylic acid; and the like. These can be used alone or in an admixture thereof.

A method for introducing the quaternary ammonium group into the molecule of the cationic polymer P is not particularly limited. Various known methods can be employed. For instance, there can be employed a method comprising preparing a polymer in which the above tertiary amino group-containing unsaturated monomer or the neutralized salt thereof is a structure unit and then, quaternizing the tertiary amino group or the neutralized tertiary ammonium group with the above quaternizing agent (I) or the quaternizing agent (II) exemplified below. Also, of course, there can be employed a method comprising preparing a quaternary cationic unsaturated monomer by reacting the tertiary amino group-containing unsaturated monomer or the neutralized salt thereof with the above quaternizing agent (II) and then, polymerizing the quaternary cationic unsaturated monomer as it is.

By using only the quaternizing agent (I) as a quaternizing agent without the quaternizing agent (II), of course, the quaternary ammonium group can be introduced into the molecule of the cationic polymer P.

A method for introducing the polymerizable double bond into the molecule of the cationic polymer P is not particularly limited. Various known methods can be employed. For instance, there can be usually employed a method comprising preparing a polymer in which the above tertiary amino group-containing unsaturated monomer or the neutralized salt thereof is a structure unit and then, quaternizing the tertiary amino group or the neutralized tertiary ammonium group with the above quaternizing agent (I).

Examples of the above quaternizing agent (I) are, for instance, glycidyl (meth)acrylate, allyl glycidyl ether, p-chloromethylstyrene and the like. These can be used alone or in an admixture thereof.

Examples of the above quaternizing agent (II) are, for instance, a known quaternizing agent such as methyl chloride, benzyl chloride, dimethyl sulfate, diethyl sulfate, epichlorohydrin, alkyl glycidyl ether, phenyl glycidyl ether, sultone, substituted sulfonate or lactone; and the like. These can be used alone or in an admixture thereof.

The above nonionic unsaturated monomer which is copolymerized with the cationic unsaturated monomer is not particularly limited. Examples of the nonionic unsaturated monomer are, for instance, a (meth)acrylic acid ester monomer such as an alkyl (meth)acrylate, a hydroxyalkyl (meth) acrylate, polyethylene glycol (meth)acrylate, methoxypolyethylene glycol (meth)acrylate, polypropylene glycol (meth) acrylate or glycidyl (meth)acrylate; a styrene monomer such as styrene, α-methylstyrene or vinyltoluene; a vinyl ester monomer such as vinyl acetate; (meth)acrylamide, (meth) acrylonitrile, N-vinylformamide; and the like. These can be used alone or in an admixture thereof.

The above nonionic unsaturated monomer is a monomer which forms the nonionic structure unit (a) in the cationic polymer P. From the viewpoint that the unsaturated monomer M is easily solubilized during microemulsion polymerization, at least one member selected from the group consisting of the styrene monomer and the (meth)acrylic acid ester monomer is particularly preferable among the above exemplified monomers.

In the process of the present invention, it is necessary that the cationic polymer P effectively functions as an emulsifier and a crosslinking agent during microemulsion polymerization of the unsaturated monomer M. Accordingly, it is necessary that the quaternary ammonium group in the prescribed amount (structure unit (b) containing the prescribed amount of structure unit ($b_1$)) is introduced into the cationic polymer P.

In order to sufficiently function as an emulsifier against the unsaturated monomer M, and in order to prepare the aimed cationic fine grain gel, the above cationic polymer P contains at least 30% by mole, preferably at least 65% by mole of the nonionic structure unit (a) and at most 70% by mole, preferably at most 35% by mole of the quaternary ammonium group-containing structure unit (b). In order to avoid lowering water solubility of the cationic polymer P, and in order to sufficiently function as an emulsifier during microemulsion polymerization, the cationic polymer P contains at most 9 2.5% by mole, preferably at most 90% by mole of the nonionic structure unit (a) and at least 7.5% by mole, preferably at least 10% by mole of the quaternary ammonium group-containing structure unit (b).

The content of the polymerizable double bond in the cationic polymer P is a significant factor so that the cationic polymer P does not separate from the resulting fine grain of polymer and that the desired crosslinking density is imparted to the resulting fine grain of polymer. However, the content can be suitably determined in accordance with the use.

In order to sufficiently increase crosslinking density of the resulting fine grain of polymer, the content of the structure unit ($b_1$) in the cationic polymer P is at least 1% by mole, preferably at least 20% by mole based on 100% by mole of the structure unit (b) and the content is at least 1% by mole, preferably at least 3% by mole based on 100% by mole of the total amount of the structure unit (a) and the structure unit (b). In order to avoid deterioration of dispersibility of polymer grains due to the aggregation during microemulsion polymerization, the content of the structure unit ($b_1$) in the cationic polymer P is at most 100% by mole based on 100% by mole of the structure unit (b) and the content is preferably at most 30% by mole based on 100% by mole of the total amount of the structure unit (a) and the structure unit (b).

The above cationic polymer P may have an anionic structure unit which is composed of an anionic unsaturated monomer such as (meth)acrylic acid unless effects of the present invention are lowered.

A process for preparing the cationic polymer P is not particularly limited. For instance, a solution polymerization method comprising using water, isopropyl alcohol or the like can be employed. When monomers such as the cationic unsaturated monomer and the nonionic unsaturated monomer are added to the polymerization reaction system, the monomers may be added all together, separately added or continuously added dropwise.

When the cationic polymer P is prepared, as usual, under the stream of inert gas such as nitrogen gas, a polymerization initiator, the above monomers and optionally, a chain transfer agent are charged under stirring and then, subjected to the copolymerization at 60° to 90° C. or so for 1 to 8 hours or so. When an aqueous solution polymerization method is employed, a polymerization initiator which is used in the general aqueous solution polymerization method can be used as a polymerization initiator without particular limitation. For instance, a peroxosulfate such as pottasium peroxosulfate or ammonium peroxosulfate can be also used. For instance, it is desired that a water soluble azo polymerization initiator such as 2,2'-azobis(2-amidinopropane) dihydrochloride, or 2,2'-azobis{2-[1-(2-hydroxyethyl)-2-imidazoline-2-yl]-propane} dihydrochloride is used. On the other hand, in a solution polymerization method with use of isopropyl alcohol or the like, an oil soluble polymerization initiator such as azoisobutyronitrile or a peroxide like benzoyl peroxide is preferably used. It is desired that the amount of the polymerization initiator is 0.03 to 5 parts by weight or so based on 100 parts by weight of the total amount of the above monomers in any polymerization method mentioned above. When the aqueous solution polymerization method is employed, in order to avoid hydrolysis of the cationic unsaturated monomer in the aqueous solution, it is desired that the tertiary amino group in the cationic unsaturated monomer is previously neutralized with the above inorganic acid or the organic acid before polymerization.

After finishing the aqueous solution polymerization reaction, there is provided a polymer in the dispersed state in water or the solubilized state in water. On the other hand, when the solution polymerization method with use of isopropyl alcohol or the like is employed, the obtained polymer after finishing the reaction is neutralized with the above organic acid or the inorganic acid, or is subjected to partial quaternization reaction with the above quaternizing agent (II), to give an aqueous dispersed polymer or an aqueous polymer solution. As occasion demands, a solvent may be removed by the steam distillation. After that, the tertiary amino group or the neutralized tertiary ammonium group in the above polymer in the dispersed state in water or the solubilized state in water is reacted with the above quaternizing agent (I) and the quaternizing agent (II) so as to contain the above prescribed amount of the structure units and then, the cationic polymer P can be prepared.

It is desired that the quaternization reaction for introducing the polymerizable double bond is carried out in an atmosphere of oxygen gas or air, and as occasion demands, a polymerization inhibitor may be added thereto.

The thus obtained cationic polymer P comprises, as mentioned above, the specific amount of the structure unit (a) and the specific amount of the structure unit (b), and has the specific amount of the structure unit ($b_1$), represented by the formula (I). In the cationic polymer P, all the structure units (b) may comprise the structure unit ($b_1$) or the structure unit (b) may contain a structure unit other than the structure unit ($b_1$) (hereinafter referred to as "structure unit ($b_2$)").

As mentioned above, the structure unit ($b_1$) is a structure unit which has been quaternized with the quaternizing agent (I), and the structure unit ($b_2$) is a structure unit which has been quaternized with the quaternizing agent (II).

Examples of the above structure unit ($b_2$) are, for instance, a structure unit represented by the formula (II):

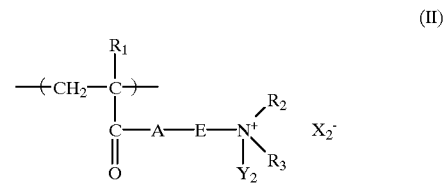

wherein each of $R_1$, $R_2$, $R_3$, A and E is the same as mentioned above, $Y_2$ is an alkyl group having 1 to 9 carbon atoms, benzyl group, an alkyloxy group-containing hydroxy-substituted hydrocarbon residual group, a phenyloxy group-containing hydroxy-substituted hydrocarbon residual group, a chloro group-containing hydroxy-substituted hydrocarbon residual group or a group represented by the formula:

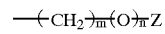

in which Z is a sulfonate anion, $SO_3H$, $COO^-$ or COOH, m is an integer of 1 to 8 and n is 0 or 1, and $X_2^-$ is $OH^-$, a halogen anion, a sulfate anion an alkylsulfate anion, an acetate anion or (meth)acrylic acid anion; and the like.

For instance, in the case that the structure unit (b) is present as an aqueous solution or an aqueous dispersion, it is considered that each of counter ions is present together and possibly, each of the counter ions is replaced with each other. That is, in the present invention, throughout the preparation of the cationic polymer P, each of the counter ions may be replaced with each other in an aqueous solution or an aqueous dispersion of the structure unit (b).

Molecular weight of the cationic polymer P used in the present invention is not particularly limited. It is desired that weight average molecular weight of the cationic polymer P is 1000 to 100000 or so, preferably 10000 to 50000 or so.

In the present invention, under the presence of the thus obtained cationic polymer P, the aimed cationic fine grain gel can be prepared by microemulsion polymerizing an unsaturated monomer M.

The above unsaturated monomer M is not particularly limited. For instance, at least one member of a known cationic unsaturated monomer, a known nonionic unsaturated monomer and the like can be used.

As a cationic unsaturated monomer, for instance, the tertiary amino group-containing cationic unsaturated monomer, the quaternary ammonium group-containing cationic unsaturated monomer and the like which are components of the above cationic polymer P can be used. As a nonionic unsaturated monomer, for instance, a nonionic unsaturated monomer and the like which are components of the above cationic polymer P can be used.

Among the above unsaturated monomers M, from the viewpoint that solubilization in the cationic polymer P is easily carried out, at least one member selected from the group consisting of the styrene monomer and the (meth) acrylic acid ester monomer is particularly preferable. In the case that the amount of a water soluble unsaturated monomer such as the cationic unsaturated monomer is increased, the water soluble unsaturated monomer is solubilized in not the cationic polymer P but water, so that the unsaturated monomer is easily polymerized with each other in water. Namely, there is a tendency that the increase in viscosity, gelation, aggregation of grain and the like occur in the resulting aqueous dispersion of a cationic fine grain gel. Accordingly, it is desired that the unsaturated monomer M comprises 0 to 30% by mole of the cationic unsaturated monomer and 100 to 70% by mole of the nonionic unsaturated monomer.

In the present invention, in order to prepare a cationic fine grain gel having a crosslinked structure by microemulsion polymerizing the unsaturated monomer M under the presence of the above cationic polymer P, during microemulsion polymerization, as occasion demands, a crosslinking agent may be used instead of the unsaturated monomer M in part.

Examples of the above crosslinking agent are, for instance, a difunctional monomer such as a di(meth)acrylate such as ethylene glycol di(meth)acrylate, diethylene glycol di(meth)acrylate or triethylene glycol di(meth)acrylate, a bis(meth)acrylamide such as methylenebis(meth)acrylamide, ethylenebis(meth)acrylamide or hexamethylenebis(meth)acrylamide, a divinyl ester such as divinyl adipate or divinyl sebacate, allyl (meth)acrylate, epoxy (meth)acrylate, urethane (meth)acrylate, N-methylol (meth)acrylamide, diallylamine, diallyldimethylammonium, diallyl phthalate, diallyl chlorendate or divinylbenzene; a trifunctional monomer such as 1,3,5-tri(meth) acryloylhexahydro-s-triazine, triallyl isocyanurate, triallylamine, triallyl trimellitate or N,N-diallyl(meth)acrylamide; a tetrafunctional monomer such as tetramethylolethane tetra(meth)acrylate, tetraallyl pyromellitate, N,N,N',N'-tetraallyl-1,4-diaminobutane, tetraallylamine salt or tetraallyloxyethane; and the like. These can be used alone or in an admixture thereof.

The amount of the crosslinking agent is not particularly limited. It is desired that the amount of the crosslinking agent is adjusted to be, as usual, 0 to 3% by mole or so of the total amount of the unsaturated monomer M.

As to the proportion of the amount of the above cationic polymer P to the amount of the unsaturated monomer M which is, as occasion demands, partially changed to the crosslinking agent, in order to remove a fear such that aggregate is generated because the unsaturated monomer M cannot be solubilized, particle diameter of the resulting cationic fine grain gel becomes larger and stability during polymerization is lowered, it is desired that the amount of the cationic polymer P (on a solid basis) is at least 80 parts by weight, preferably at least 90 parts by weight based on 100 parts by weight of the unsaturated monomer M. Also, in order to remove a fear such that viscosity increases to become sol during polymerization and gelation occurs, it is desired that the amount of the cationic polymer P (on a solid basis) is at most 300 parts by weight, preferably at most 250 parts by weight based on 100 parts by weight of the unsaturated monomer M.

When the unsaturated monomer M and, as occasion demands, the crosslinking agent are microemulsion polymerized under the presence of the above cationic polymer P, various conditions such as polymerization temperature, polymerization time, and the kinds of polymerization initiator, chain transfer agent and polymerization medium are not particularly limited. The conditions may be suitably selected according to conditions in a usual emulsion polymerization. For instance, concretely, many of conditions may be the same as the conditions in the preparation of the above cationic polymer P.

When the microemulsion polymerization is carried out, unless properties of the resulting cationic fine grain gel are not lowered, a low molecular surface active agent and a water soluble high molecular compound such as casein, lecithin, polyvinyl alcohol or an acrylamide copolymer can be used.

The thus obtained aqueous dispersion of a cationic fine grain gel of the present invention is, as usual, an aqueous dispersion of which content of solid matter is 10 to 30% by weight, pH is 4 to 6 and viscosity at 25° C. is at most 500 cP.

The aqueous dispersion of a cationic fine grain gel of the present invention is an aqueous dispersion containing an internally crosslinked fine grain gel (cationic fine grain gel) of which surface density of electric charge ($\zeta$-potential) is preferably at least +20 mV, more preferably at least +35 mV and average particle diameter in the swelling state in water, measured by a light scattering method is, as usual, at most 300 nm, preferably at most 150 nm, more preferably at most 100 nm.

As mentioned above, the aqueous dispersion of the present invention is not solubilized in any organic solvent, grain form can be maintained and excellent mehanical properties are exhibited because the cationic fine grain is internally crosslinked. Also, because the quaternary ammonium group is in the surface of the grain, the surface of the grain is charged positive, the density of electric charge is high and there are no isoelectric points. Furthermore, owing to electrostatic functions, that is, the above high surface density of electric charge, the mechanical stability is also excellent.

Hereinafter, the aqueous dispersion of a cationic fine grain gel and the process for preparing the same of the present invention are more concretely explained in accordance with Examples, and it is to be understood that the present invention is not limited to the Examples.

EXAMPLE 1

(1) Preparation of cationic polymer P

A reaction apparatus equipped with a stirrer, a reflux condenser, a tube for introducing nitrogen gas and a thermometer was charged with 123.7 parts (parts by weight, hereinafter the same) (118.9 parts by mole) of styrene, 36.3 parts (25.5 parts by mole) of butyl methacrylate, 40 parts (25.5 parts by mole) of N,N-dimethylaminoethyl methacrylate, 100 parts of isopropyl alcohol and 5 parts of azoisobutyronitrile as a polymerization initiator, and the contents were stirred and uniformly mixed with each other. In an atmosphere of nitrogen gas, the mixture was heated to 80° C. with stirring and the temperature of the mixture was maintained for 6 hours and then, the polymerization was finished. The mixture was cooled to 60° C. and 15.3 parts (25.5 parts by mole) of acetic acid was added thereto and then, the contents were stirred for 30 minutes. After that, 600 parts of ion-exchange water and 36.2 parts (25.5 parts by mole) of glycidyl methacrylate were added thereto and the contents were heated to 60° C. in an atmosphere of air and then, the quaternization reaction was carried out with maintaining the temperature of the reaction mixture for 3 hours. Furthermore, the content of solid matter of the reaction mixture was adjusted to be 25% by weight by using ion-exchange water to give an aqueous solution of a cationic polymer P-1. As to the aqueous solution, pH was 6.3 and the viscosity at 25° C. was 250 cP. Also, the weight average molecular weight of the cationic polymer P-1 was 45000.

The proportion of the amount of the structure unit (a) to the amount of the structure unit (b) and the content of the structure unit ($b_1$) in the obtained cationic polymer P-1 are shown in Table 1.

(2) Preparation of aqueous dispersion of cationic fine grain gel

After the above reaction apparatus was charged with 400 parts of the above aqueous solution of the cationic polymer P-1 and 490 parts of ion-exchange water, 100 parts of butyl acrylate was added thereto with stirring and the contents were emulsified. Then, thereto was added 10 parts of 1% by weight aqueous solution of 2,2'-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 20% by weight, pH was 5.5 and the viscosity at 25° C. was 25 cP. Also, as to the cationic fine grain gel contained in the aqueous dispersion, the surface density of electric charge ($\zeta$-potential) was +39 mV and the average particle diameter in water was 65 nm.

In Example 1 and the following Examples 2 to 6 and Comparative Examples 1 to 2, based on the electrical mobility measured by using Electrophoretic Light Scattering Spectrophotometer (made by OTSUKA ELECTRONICS Kabushiki Kaisha, ELS-800), the $\zeta$-potential was calculated in accordance with the following Smoluchouski's equation:

$$U = \epsilon \zeta / 4\pi\eta$$

(U: electrical mobility, $\epsilon$: dielectric constant of solution, $\zeta$: $\zeta$-potential, $\eta$: viscosity of solvent). Also, the average particle diameter was measured in accordance with the light scattering method by using Laser Particle Analyzer System (made by OTSUKA ELECTRONICS Kabushiki Kaisha, PAR-III).

The above surface density of electric charge ($\zeta$-potential), the average particle diameter, the kinds of the cationic polymer P used therein and the proportion of the amount of the cationic polymer P (on a solid basis) to the amount of the unsaturated monomer M (P/M (weight ratio)) are shown in Table 2.

EXAMPLE 2

(1) Preparation of cationic polymer P

The same reaction apparatus as used in Example 1 was charged with 123.7 parts (118.9 parts by mole) of styrene, 36.3 parts (25.5 parts by mole) of butyl methacrylate, 40 parts (25.5 parts by mole) of N,N-dimethylaminoethyl methacrylate, 100 parts of isopropyl alcohol and 5 parts of azoisobutyronitrile as a polymerization initiator, and the contents were stirred and uniformly mixed with each other. In an atmosphere of nitrogen gas, the mixture was heated to 80° C. with stirring and the temperature of the mixture was maintained for 6 hours and then, the polymerization was finished. The mixture was cooled to 60° C. and 11.8 parts (7.7 parts by mole) of diethyl sulfate was added thereto and then, the temperature of the contents was maintained for 1 hour. Then, after 10.7 parts (17.8 parts by mole) of acetic acid was added thereto and the contents were stirred for 30 minutes, 600 parts of ion-exchange water and 25.4 parts (17.8 parts by mole) of glycidyl methacrylate were added thereto and the contents were heated to 60° C. in an atmosphere of air and then, the quaternization reaction was carried out with maintaining the temperature of the reaction mixture for 3 hours. Furthermore, the content of solid matter of the reaction mixture was adjusted to be 25% by weight by using ion-exchange water to give an aqueous solution of a cationic polymer P-2. As to the aqueous solution, pH was 6.0 and the viscosity at 25° C. was 400 cP. Also, the weight average molecular weight of the cationic polymer P-2 was 45000.

The proportion of the amount of the structure unit (a) to the amount of the structure unit (b) and the content of the structure unit ($b_1$) in the obtained cationic polymer P-2 are shown in Table 1.

(2) Preparation of aqueous dispersion of cationic fine grain gel

After the above reaction apparatus was charged with 400 parts of the above aqueous solution of the cationic polymer P-2 and 490 parts of ion-exchange water, 100 parts of 2-ethylhexyl acrylate was added thereto with stirring and the contents were emulsified. Then, thereto was added 10 parts of 1% by weight aqueous solution of 2,2'-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 20% by weight, pH was 5.4 and the viscosity at 25° C. was 21 cP. Also, as to the cationic fine grain gel contained in the aqueous dispersion, the $\zeta$-potential was +38 mV and the average particle diameter in water was 71 nm.

The above surface density of electric charge ($\zeta$-potential), the average particle diameter, the kinds of the cationic polymer P used therein and the proportion of the amount of the cationic polymer P (on a solid basis) to the amount of the unsaturated monomer M (P/M (weight ratio)) are shown in Table 2.

EXAMPLE 3

(1) Preparation of cationic polymer P

The same reaction apparatus as used in Example 1 was charged with 123.7 parts (118.9 parts by mole) of styrene, 36.3 parts (25.5 parts by mole) of butyl methacrylate, 40 parts (25.5 parts by mole) of N,N-dimethylaminoethyl methacrylate, 100 parts of isopropyl alcohol and 5 parts of azoisobutyronitrile as a polymerization initiator, and the contents were stirred and uniformly mixed with each other. In an atmosphere of nitrogen gas, the mixture was heated to 80° C. with stirring and the temperature of the mixture was maintained for 6 hours and then, the polymerization was finished. The mixture was cooled to 60° C. and 15.3 parts (25.5 parts by mole) of acetic acid was added thereto and then, the contents were stirred for 30 minutes. After that, 600 parts of ion-exchange water, 16.5 parts (17.8 parts by mole) of epichlorohydrin and 10.9 parts (7.7 parts by mole) of glycidyl methacrylate were added thereto and the contents were heated to 60° C. in an atmosphere of air and then, the quaternization reaction was carried out with maintaining the temperature of the reaction mixture for 3 hours. Furthermore, the content of solid matter of the reaction mixture was adjusted to be 25% by weight by using ion-exchange water to give an aqueous solution of a cationic polymer P-3. As to the aqueous solution, pH was 6.1 and the viscosity at 25° C. was 150 cP. Also, the weight average molecular weight of the cationic polymer P-3 was 45000.

The proportion of the amount of the structure unit (a) to the amount of the structure unit (b) and the content of the structure unit ($b_1$) in the obtained cationic polymer P-3 are shown in Table 1.

(2) Preparation of aqueous dispersion of cationic fine grain gel

After the above reaction apparatus was charged with 400 parts of the above aqueous solution of the cationic polymer P-3 and 490 parts of ion-exchange water, 100 parts of styrene was added thereto with stirring and the contents were emulsified. Then, thereto was added 10 parts of 1% by weight aqueous solution of 2,2'-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 20% by weight, pH was 5.6 and the viscosity at 25° C. was 15 cP. Also, as to the cationic fine grain gel contained in the aqueous dispersion, the $\zeta$-potential was +40 mV and the average particle diameter in water was 54 nm.

The above surface density of electric charge ($\zeta$-potential), the average particle diameter, the kinds of the cationic polymer P used therein and the proportion of the amount of the cationic polymer P (on a solid basis) to the amount of the unsaturated monomer M (P/M (weight ratio)) are shown in Table 2.

EXAMPLE 4

(1) Preparation of cationic polymer P

The same reaction apparatus as used in Example 1 was charged with 121.4 parts (116.7 parts by mole) of styrene, 78.6 parts (50 parts by mole) of N,N-dimethylaminoethyl methacrylate, 100 parts of isopropyl alcohol and 5 parts of azoisobutyronitrile as a polymerization initiator, and the contents were stirred and uniformly mixed with each other. In an atmosphere of nitrogen gas, the mixture was heated to 80° C. with stirring and the temperature of the mixture was maintained for 6 hours and then, the polymerization was finished. The mixture was cooled to 60° C. and 30 parts (50 parts by mole) of acetic acid was added thereto and then, the contents were stirred for 30 minutes. After that, 600 parts of ion-exchange water and 71.1 parts (50 parts by mole) of glycidyl methacrylate were added thereto and the contents were heated to 60° C. in an atmosphere of air and then, the quaternization reaction was carried out with maintaining the temperature of the reaction mixture for 3 hours. Furthermore, the content of solid matter of the reaction mixture was adjusted to be 25% by weight by using ion-exchange water to give an aqueous solution of a cationic polymer P-4. As to the aqueous solution, pH was 6.3 and the viscosity at 25° C. was 200 cP. Also, the weight average molecular weight of the cationic polymer P-4 was 42000.

The proportion of the amount of the structure unit (a) to the amount of the structure unit (b) and the content of the structure unit ($b_1$) in the obtained cationic polymer P-4 are shown in Table 1.

(2) Preparation of aqueous dispersion of cationic fine grain gel

After the above reaction apparatus was charged with 200 parts of the above aqueous solution of the cationic polymer P-4 and 410 parts of ion-exchange water, 50 parts of butyl acrylate was added thereto with stirring and the contents were emulsified. Then, thereto was added 5 parts of 1% by weight aqueous solution of 2,2-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 15% by weight, pH was 5.5 and the viscosity at 25° C. was 450 cP. Also, as to the cationic fine grain gel contained in the aqueous dispersion, the $\zeta$-potential was +45 mV and the average particle diameter in water was 98 nm.

The above surface density of electric charge ($\zeta$-potential), the average particle diameter, the kinds of the cationic polymer P used therein and the proportion of the amount of the cationic polymer P (on a solid basis) to the amount of the unsaturated monomer M (P/M (weight ratio)) are shown in Table 2.

EXAMPLE 5

After the same reaction apparatus as used in Example 1 was charged with 400 parts of the above aqueous solution of the cationic polymer P-3 and 540 parts of ion-exchange water, 50 parts of methyl methacrylate was added thereto with stirring and the contents were emulsified. Then, thereto was added 10 parts of 1% by weight aqueous solution of 2,2'-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 15% by weight, pH was 5.8 and the viscosity at 25° C. was 23 cP. Also, as to the cationic fine grain gel contained in the aqueous dispersion, the $\zeta$-potential was +42 mV and the average particle diameter in water was 54 nm.

The above surface density of electric charge ($\zeta$-potential), the average particle diameter, the kinds of the cationic polymer P used therein and the proportion of the amount of the cationic polymer P (on a solid basis) to the amount of the unsaturated monomer M (P/M (weight ratio)) are shown in Table 2.

EXAMPLE 6

(1) Preparation of cationic polymer P

The same reaction apparatus as used in Example 1 was charged with 123.7 parts (118.9 parts by mole) of styrene, 36.3 parts (25.5 parts by mole) of butyl methacrylate, 40 parts (25.5 parts by mole) of N,N-dimethylaminoethyl methacrylate, 100 parts of isopropyl alcohol and 5 parts of azoisobutyronitrile as a polymerization initiator, and the contents were stirred and uniformly mixed with each other. In an atmosphere of nitrogen gas, the mixture was heated to 80° C. with stirring and the temperature of the mixture was maintained for 6 hours and then, the polymerization was finished. The mixture was cooled to 60° C. and 19.6 parts (12.7 parts by mole) of diethyl sulfate was added thereto and then, the temperature of the contents was maintained for 1 hour. Then, after 600 parts of ion-exchange water was added thereto and the contents were stirred for 30 minutes, 18.1 parts (12.7 parts by mole) of glycidyl methacrylate was added thereto and the contents were heated to 60° C. in an atmosphere of air and then, the quaternization reaction was carried out with maintaining the temperature of the reaction mixture for 3 hours to give an aqueous solution. The pH of the aqueous solution was 8.5. To the aqueous solution was added 7.6 parts (12.7 parts by mole) of acetic acid and furthermore, the content of solid matter of the reaction aqueous solution was adjusted to be 25% by weight by using ion-exchange water to give an aqueous solution of a cationic polymer P-5. As to the aqueous solution, pH was 6.0 and the viscosity at 25° C. was 420 cP. Also, the weight average molecular weight of the cationic polymer P-5 was 45000.

The proportion of the amount of the structure unit (a) to the amount of the structure unit (b) and the content of the structure unit ($b_1$) in the obtained cationic polymer P-5 are shown in Table 1.

(2) Preparation of aqueous dispersion of cationic fine grain gel

After the above reaction apparatus was charged with 400 parts of the above aqueous solution of the cationic polymer P-5 and 490 parts of ion-exchange water, 100 parts of styrene was added thereto with stirring and the contents were emulsified. Then, thereto was added 10 parts of 1% by weight aqueous solution of 2,2-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 20% by weight, pH was 4.9 and the viscosity at 25° C. was 15 cP. Also, as to the cationic fine grain gel contained in the aqueous dispersion, the $\zeta$-potential was +41 mV and the average particle diameter in water was 60 nm.

The above surface density of electric charge ($\zeta$-potential), the average particle diameter, the kinds of the cationic polymer P used therein and the proportion of the amount of the cationic polymer P (on a solid basis) to the amount of the unsaturated monomer M (P/M (weight ratio)) are shown in Table 2.

COMPARATIVE EXAMPLE 1

(1) Preparation of cationic polymer

The same reaction apparatus as used in Example 1 was charged with 123.7 parts (118.9 parts by mole) of styrene, 36.3 parts (25.5 parts by mole) of butyl methacrylate, 40 parts (25.5 parts by mole) of N,N-dimethylaminoethyl methacrylate, 100 parts of isopropyl alcohol and 5 parts of azoisobutyronitrile as a polymerization initiator, and the contents were stirred and uniformly mixed with each other. In an atmosphere of nitrogen gas, the mixture was heated to 80° C. with stirring and the temperature of the mixture was maintained for 6 hours and then, the polymerization was finished. The mixture was cooled to 60° C. and 15.3 parts (25.5 parts by mole) of acetic acid was added thereto and then, the contents were stirred for 30 minutes. After that, 600 parts of ion-exchange water was added thereto and the contents were dissolved to give a solution. Furthermore, the content of solid matter of the solution was adjusted to be 25% by weight by using ion-exchange water to give an aqueous solution of a cationic polymer P'-1. As to the aqueous solution, pH was 5.9 and the viscosity at 25° C. was 90 cP. Also, the weight average molecular weight of the cationic polymer P'-1 was 45000.

The proportion of the amount of the structure unit (a) to the amount of the structure unit (b) and the content of the structure unit ($b_1$) in the obtained cationic polymer P'-1 are shown in Table 1.

(2) Preparation of aqueous dispersion of cationic fine grain gel

After the above reaction apparatus was charged with 400 parts of the above aqueous solution of the cationic polymer P'-1 and 500 parts of ion-exchange water, 100 parts of butyl acrylate was added thereto with stirring and the contents were emulsified. Then, thereto was added 10 parts of 1% by weight aqueous solution of 2,2'-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 20% by weight, pH was 5.4 and the viscosity at 25° C. was 20 cP. There were many secondary aggregates in the aqueous dispersion and particle size distribution was large and the average particle diameter in water of the cationic fine grain gel contained in the aqueous dispersion was 350 nm. Also, the $\zeta$-potential of the cationic fine grain gel was +29 mV.

The above surface density of electric charge ($\zeta$-potential), the average particle diameter, the kinds of the cationic polymer P' used therein and the proportion of the amount of the cationic polymer P' (on a solid basis) to the amount of the unsaturated monomer M (P'/M (weight ratio)) are shown in Table 2.

COMPARATIVE EXAMPLE 2

The same reaction apparatus as used in Example 1 was charged with 104 parts of quaternary ammonium salt type cationic emulsifier (made by Takemoto Oil & Fat Kabushiki Kaisha, trade name: Pionin B-2 211, effective component: 75% by weight), 40 parts of 1-pentanol and 660 parts of ion-exchange water, and pH of the contents was adjusted to 5.5 with acetic acid. After that, thereto were added 44 parts of butyl acrylate and 0.8 part of divinylbenzene (purity: 55% by weight) with stirring and the contents were emulsified. Then, thereto was added 10 parts of 1% by weight aqueous solution of 2,2'-azobis(2-amidinopropane) dihydrochloride and the contents were heated to 80° C. with stirring in an atmosphere of nitrogen gas and then, the polymerization was finished with maintaining the temperature of the contents for 4 hours to give an aqueous dispersion of a cationic fine grain gel. As to the aqueous dispersion, the content of solid matter was 15% by weight, pH was 5.5 and the viscosity at 25° C. was 35 cP. Also, as to the cationic fine grain gel contained in the aqueous dispersion, the $\zeta$-potential was +36 mV and the average particle diameter in water was 25 nm.

The above surface density of electric charge ($\zeta$-potential) and the average particle diameter are shown in Table 2.

As to properties of the aqueous dispersions of the cationic fine grain gel obtained in Examples 1 to 6 and Comparative Examples 1 to 2, storage stability, susceptibility to bubbling and water resistance were examined in accordance with the following methods. The results are shown in Table 2.

(1) Storage stability

After the aqueous dispersion of the cationic fine grain gel was allowed to stand at 25° C. for 1 month, the state of the aqueous dispersion was observed with the naked eyes and storage stability was evaluated based on the following criteria for evaluation.

(Criteria for evaluation) ○: No precipitate is generated and no change is observed. Δ: A few precipitates are generated. X: Precipitates are clearly generated.

(2) Susceptibility to bubbling

The aqueous dispersion of the cationic fine grain gel was diluted with deionized water to give a 5% by weight diluted solution. By using the diluted solution, height of the generated foam (mm) was measured in accordance with the method described in JIS (Japanese Industrial Standard) K 3362.

(3) Water resistance

The aqueous dispersion of the cationic fine grain gel was coated on a glass plate and the glass plate was dried at 100° C. to give a film having a thickness of about 100 μm. After that, water drops were dropped on the film and the existence of stickiness on the surface of the water drops which were rubbed with fingers was examined. Then, water resistance was evaluated based on the following criteria for evaluation.

(Criteria for evaluation) ○: No stickiness is recognized. Δ: A little stickiness is recognized. X: Stickiness is remarkably recognized.

TABLE 1

| Kinds of cationic polymer | Proportion of structure unit (a) to structure unit (b) ((a)/(b) (molar ratio)) | Content of structure unit ($b_1$) (% by mole) | |
|---|---|---|---|
| | | Based on 100% by mole of structure unit (b) | Based on 100% by mole of the total amount of structure unit (a) and structure unit (b) |
| P-1 | 85/15 | 100 | 15 |
| P-2 | 85/15 | 70 | 10.5 |
| P-3 | 85/15 | 30 | 4.5 |
| P-4 | 70/30 | 100 | 30 |
| P-5 | 85/15 | 50 | 7.5 |
| P-1 | 85/15 | 0 | 0 |

TABLE 2

| | Cationic polymer/ Unsaturated monomer (weight ratio) | Physical properties of cationic fine grain gel | | Properties of aqueous dispersion of cationic fine grain gel | | |
|---|---|---|---|---|---|---|
| Kinds of cationic polymer | | ζ-Potential (mV) | Average particle diameter (nm) | Storage stability (25° C., 1 month) | Susceptibility to bubbling (height of foam (mm)) | Water resistance |
| Ex. No. | | | | | | | |
| 1 | P-1 | 100/100 | +39 | 65 | ○ | 31 | ○ |
| 2 | P-2 | 100/100 | +38 | 71 | ○ | 29 | ○ |
| 3 | P-3 | 100/100 | +40 | 54 | ○ | 33 | ○ |
| 4 | P-4 | 100/100 | +45 | 98 | ○ | 24 | ○ |
| 5 | P-3 | 200/100 | +42 | 54 | ○ | 30 | ○ |
| 6 | P-5 | 100/100 | +41 | 60 | ○ | 35 | ○ |
| Com. Ex. | | | | | | | |
| 1 | P'-1 | 100/100 | +29 | 350 (Secondary aggregated) | X | 28 | ○ |
| 2 | — | — | +36 | 25 | ○ | 95 | X |

From the results shown in Table 2, it can be understood that every aqueous dispersion of the cationic fine grain gel obtained in Examples 1 to 6 is excellent in storage stability and shows less susceptibility to bubbling such as 30 mm or so of height of foam and also, is excellent in water resistance.

INDUSTRIAL APPLICABILITY

In accordance with the process of the present invention, aqueous dispersions of a cationic fine grain gel, which are excellent in polymerization stability, storage stability, water resistance and the like and show less susceptibility to bubbling can be easily provided.

The aqueous dispersion of a cationic fine grain gel of the present invention can be applied for, for instance, chemicals for paper making, chemicals for wastewater treatment, antistatic agents, ion-exchange resins, coating materials, antibacterial agents, absorbents, agents for textile treatment, mordants and the like. The cationic fine grain gel itself, which can be obtained by removing water from the aqueous dispersion of a cationic fine grain gel, has the same utility as mentioned above.

I claim:

1. A process for preparing an aqueous dispersion of a cationic fine grain gel, characterized by microemulsion polymerizing an unsaturated monomer M under the presence of a polymer P which is a polymer containing 30 to 92.5% by mole of a nonionic structure unit (a) and 70 to 7.5% by mole of a quaternary ammonium group-containing structure unit (b), and in which the content of a structure unit ($b_1$) having a quaternary ammonium group and a polymerizable double bond, represented by the formula (I):

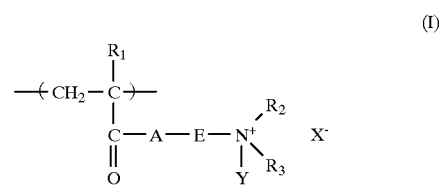

wherein $R_1$ is hydrogen atom or methyl group, each of $R_2$ and $R_3$ is independently an alkyl group having 1 to 4 carbon atoms, A is —O— or —NH—, E is an alkylene group having 2 to 4 carbon atoms or a hydroxy-substituted alkylene group, Y is an aliphatic hydrocarbon residual group substituted with a hydroxy group and having one allyloxy group or one (meth)acryloyl group, or is a vinyl aromatic hydrocarbon residual group, and $X^-$ is a halogen anion, a sulfate anion, an alkylsulfate anion, an acetate anion, (meth) acrylic acid anion or OH-, is 1 to 100% by mole based on 100% by mole of said structure unit (b), and said content is at least 1% by mole based on 100% by mole of the total amount of said structure unit (a) and said structure unit (b).

2. The process for preparing an aqueous dispersion of claim 1, wherein a nonionic unsaturated monomer which forms said nonionic structure unit (a) in said polymer P is at least one member selected from the group consisting of a styrene monomer and a (meth)acrylic acid ester monomer.

3. The process for preparing an aqueous dispersion of claim 1, wherein weight average molecular weight of said polymer p is 1000 to 100,000.

4. The process for preparing an aqueous dispersion of claim 1, wherein the content of said structure unit ($b_1$) in said polymer P is 20 to 100% by mole based on 100% by mole of said structure unit (b).

5. The process for preparing an aqueous dispersion of claim 1, wherein the content of said structure unit ($b_1$) in said polymer P is 3 to 30% by mole based on 100% by mole of the total amount of said structure unit (a) and said structure unit (b).

6. The process for preparing an aqueous dispersion of claim 1, wherein 80 to 300 parts by weight of said polymer P is used based on 100 parts by weight of said unsaturated monomer M.

7. The process for preparing an aqueous dispersion of claim 6, wherein 90 to 250 parts by weight of said polymer P is used based on 100 parts by weight of said unsaturated monomer M.

8. The process for preparing an aqueous dispersion of claim 1, wherein said unsaturated monomer M is at least one member selected from the group consisting of a styrene monomer and a (meth)acrylic acid ester monomer.

9. The process for preparing an aqueous dispersion of claim 1, wherein surface density of electric charge ($\zeta$-potential) of said cationic fine grain gel is at least +20 mV.

10. The process for preparing an aqueous dispersion of claim 1, wherein average particle diameter in water of said cationic fine grain gel is at most 300 nm.

11. An aqueous dispersion of a cationic fine grain gel obtainable by the process of claim 1.

* * * * *